(12) United States Patent
Morita et al.

(10) Patent No.: US 12,527,902 B2
(45) Date of Patent: Jan. 20, 2026

(54) ATTACHING MEMBER

(71) Applicant: Nikkiso Company Limited, Tokyo (JP)

(72) Inventors: Masayuki Morita, Shizuoka (JP); Shunsuke Kawamura, Shizuoka (JP)

(73) Assignee: Nikkiso Company Limited, Tokyo (JP)

( * ) Notice: Subject to any disclaimer, the term of this patent is extended or adjusted under 35 U.S.C. 154(b) by 207 days.

(21) Appl. No.: 17/348,037

(22) Filed: Jun. 15, 2021

(65) Prior Publication Data

US 2021/0308355 A1 Oct. 7, 2021

Related U.S. Application Data

(63) Continuation of application No. PCT/JP2019/051336, filed on Dec. 26, 2019.

(30) Foreign Application Priority Data

Dec. 27, 2018 (JP) ................. 2018-246173

(51) Int. Cl.
*A61M 1/36* (2006.01)
*A61M 1/14* (2006.01)
*A61M 1/34* (2006.01)

(52) U.S. Cl.
CPC .............. *A61M 1/367* (2013.01); *A61M 1/14* (2013.01); *A61M 1/3424* (2014.02); *A61M 2209/082* (2013.01)

(58) Field of Classification Search
None
See application file for complete search history.

(56) References Cited

U.S. PATENT DOCUMENTS

| | | | |
|---|---|---|---|
| 2008/0093246 A1* | 4/2008 | Duchamp | B65D 85/38 210/646 |
| 2010/0200706 A1* | 8/2010 | Harding | A61M 5/1418 248/62 |
| 2018/0008798 A1* | 1/2018 | Quiroz | A61M 25/002 |
| 2020/0001003 A1* | 1/2020 | Amir | C09J 7/30 |

FOREIGN PATENT DOCUMENTS

| | | |
|---|---|---|
| CN | 102355912 A | 2/2012 |
| EP | 2682608 A1 | 1/2014 |
| JP | S60-148069 U | 10/1985 |
| JP | 2005-074234 A | 3/2005 |
| JP | 2006-212050 A | 8/2006 |

(Continued)

OTHER PUBLICATIONS

Potentially related patent application filed herewith and published as WO2020/137016 A1.

(Continued)

*Primary Examiner* — Jonathan M Peo
(74) *Attorney, Agent, or Firm* — Young Basile Hanlon & MacFarlane, P.C.

(57) ABSTRACT

The present teachings provide an attaching member that holds a flexible tube through which liquid related to blood purification treatment is made to flow. The attaching member is attached to a blood purification apparatus and includes an anchor portion defined by a slit in such a manner as to be separated from an other portion and to be foldable, the anchor portion being capable of anchoring the flexible tube when folded to be raised from the other portion.

20 Claims, 8 Drawing Sheets

(56) References Cited

FOREIGN PATENT DOCUMENTS

| JP | 2008-000425 A | 1/2008 |
|----|---------------|--------|
| JP | 2010-190062 A | 9/2010 |
| JP | 2015-073847 A | 4/2015 |
| JP | 2015-202248 A | 11/2015 |
| JP | 2017-140521 A | 8/2017 |
| JP | 2017-164285 A | 9/2017 |
| WO | 1995/017603 A1 | 6/1995 |
| WO | 1996/040322 A2 | 12/1996 |
| WO | 2013/090579 A1 | 6/2013 |
| WO | 2013/098028 A1 | 7/2013 |
| WO | 2018/225027 A1 | 12/2018 |

OTHER PUBLICATIONS

Potentially related patent application filed herewith and published as WO2020/138381 A1.
Potentially related patent application that will be filed with the USPTO, and is published as WO2020/138382 A1.
Potentially related patent application that will be filed with the USPTO, and is published as WO2020/138383 A1.
Potentially related patent application that will be filed with the USPTO, and is published as WO2020/138384 A1.
European Search Report for Application No. 19902013.2, dated Sep. 9, 2022, 14 pgs.
Chinese Office Action for Application No. 201980085677.0, dated Jun. 11, 2024, and its English translation, 11 pgs.
Chinese Office Action for Application No. 201980085677.0, dated Dec. 7, 2023, with English translation, 11 pgs.

* cited by examiner

ATTACHING MEMBER

CROSS-REFERENCE TO RELATED APPLICATION(S)

This application is a continuation of International Application No. PCT/JP2019/051336, filed on Dec. 26, 2019, which claims priority to Japanese Application No. 2018-246173, filed on Dec. 27, 2018, the entire disclosures of which are hereby incorporated by reference.

FIELD

The present teachings relate to an attaching member on which components related to blood purification treatment or flexible tubes through which liquids related to blood purification treatment are made to flow are provided, the attaching member being attached to a blood purification apparatus.

BACKGROUND

In general, a blood purification apparatus for giving dialysis treatment is provided with an arterial blood circuit and a venous blood circuit that form a blood circuit for causing blood of a patient to extracorporeally circulate, a blood purifier for purifying the blood extracorporeally circulating through the blood circuit, and various treatment devices, such as a blood pump, for performing blood purification treatment with the blood circuit and the blood purifier. After the patient is punctured with an arterial puncture needle and a venous puncture needle, the blood pump is activated. Thus, blood of the patient flows through the arterial blood circuit and the venous blood circuit. In such a flowing process, the blood is purified by the blood purifier.

A hitherto known attaching member attachable to a blood purification apparatus is disclosed by PTL 1. The attaching member holds flexible tubes through which liquids related to blood purification treatment are made to flow and is configured to be attached to a blood purification apparatus. The attaching member has guide-shaped portions or groove-shaped portions for holding the flexible tubes. The guide-shaped portions or groove-shaped portions are formed continuously with the attaching member in the form of pairs of block-like portions between each of which a flexible tube is holdable.

PTL 1: Japanese Unexamined Patent Application Publication No. 2017-164285, the teachings of which are expressly incorporated by reference herein for all purposes.

SUMMARY

In the above known attaching member, however, since the guide-shaped portions or groove-shaped portions for holding the flexible tubes are formed continuously with the attaching member in the form of block-like portions, problems arise in that the size of the attaching member as a whole tends to be large and that the flexible tubes tend to have kinks or bends.

The present teachings have been conceived in view of the above circumstances and provides an attaching member capable of assuredly holding a flexible tube while avoiding the increase in the size thereof and suppressing the occurrence of kinks or bends in the flexible tube.

Variation 2 may comprise an attaching member that holds a flexible tube through which liquid related to blood purification treatment is made to flow. The attaching member is attached to a blood purification apparatus and includes an anchor portion defined by a slit in such a manner as to be separated from an other portion and to be foldable, the anchor portion being capable of anchoring the flexible tube when folded to be raised from the other portion.

Variation 2 may comprise the attaching member according to variation 1, wherein the anchor portion has an opening into which the flexible tube is inserted to be anchored.

Variation 3 may comprise the attaching member according to variation 2, wherein the anchor portion has a semicircular shape with an arc conforming to an outer peripheral surface of the flexible tube.

Variation 4 may comprise the attaching member according to variation 1, wherein the anchor portion has a hook shape with an arc conforming to an outer peripheral surface of the flexible tube.

Variation 5 may comprise the attaching member according to variations 3 or 4, wherein the anchor portion has a plurality of arcs each conforming to the outer peripheral surface of the flexible tube.

Variation 6 may comprise the attaching member according to any of variations 1 to 5, an orientation of the anchor portion that is in a raised state is set in accordance with a direction in which the flexible tube extends.

Variation 7 may comprise the attaching member according to any of variations 1 to 6, wherein the slit is one of a plurality of slits provided at arbitrary positions, and any selected portion that is defined by a specific one of the slits is folded in such a manner as to be raised and to form the anchor portion at an arbitrary position where the flexible tube is to be anchored.

Variation 8 may comprise a blood purification circuit to be anchored by the anchor portion according to any of variations 1 to 7. The blood purification circuit includes a blood circuit through which blood is caused to extracorporeally circulate, and a flow route through which substitution fluid is introduced into the blood circuit or a flow route through which dialysate is introduced into a blood purifier connected to the blood circuit or through which drain liquid is drained from the blood purifier.

According to variation 1, the attaching member includes the anchor portion defined by the slit in such a manner as to be separated from the other portion and to be foldable, the anchor portion being capable of anchoring the flexible tube when folded to be raised from the other portion. Therefore, while the flexible tube is held assuredly, the increase in the size can be avoided, and the occurrence of kinks or bends in the flexible tube can be suppressed.

According to variation 2, the anchor portion has the opening into which the flexible tube is inserted to be anchored. Therefore, the flexible tube can be held assuredly.

According to variation 3, the anchor portion has the semicircular shape with the arc conforming to the outer peripheral surface of the flexible tube. Therefore, the flexible tube can be held stably and much more assuredly.

According to variation 4, the anchor portion has the hook shape with the arc conforming to the outer peripheral surface of the flexible tube. Therefore, the flexible tube can be held stably. Furthermore, the anchoring of the flexible tube at the anchor portion can be achieved easily.

According to variation 5, the anchor portion has the plurality of arcs each conforming to the outer peripheral surface of the flexible tube. Therefore, a plurality of flexible tubes can be held collectively with one anchor portion. That is, a plurality of flexible tubes can be held efficiently.

According to variation 6, the orientation of the anchor portion that is in the raised state is set in accordance with the direction in which the flexible tube extends. Therefore, the application of an unnatural force to the flexible tube anchored by the anchor portion can be suppressed.

According to variation 7, the slit is one of a plurality of slits provided at arbitrary positions, and any selected portion that is defined by a specific one of the slits is folded in such a manner as to be raised and to form the anchor portion at an arbitrary position where the flexible tube is to be anchored. Therefore, portions where no flexible tubes are anchored do not need to be raised, preventing the interference with any other portion or flexible tube.

According to variation 8, a blood purification circuit that produces the advantageous effects according to variations 1 to 7 can be provided.

DETAILED DESCRIPTION

Embodiments of the present teachings will now be described specifically with reference to the drawings.

Attaching members according to the present embodiment are to be attached to a blood purification apparatus including peristaltic pumps. The attaching members hold flexible tubes through which liquids related to blood purification treatment are made to flow. As illustrated in FIGS. 1 to 6, the attaching members include an attaching member 1 to be attached to a predetermined position Ba at the top of a blood purification apparatus B, and an attaching member 4 (another attaching member) to be attached to a predetermined position Bb on the front face of the blood purification apparatus B.

Figure 1:
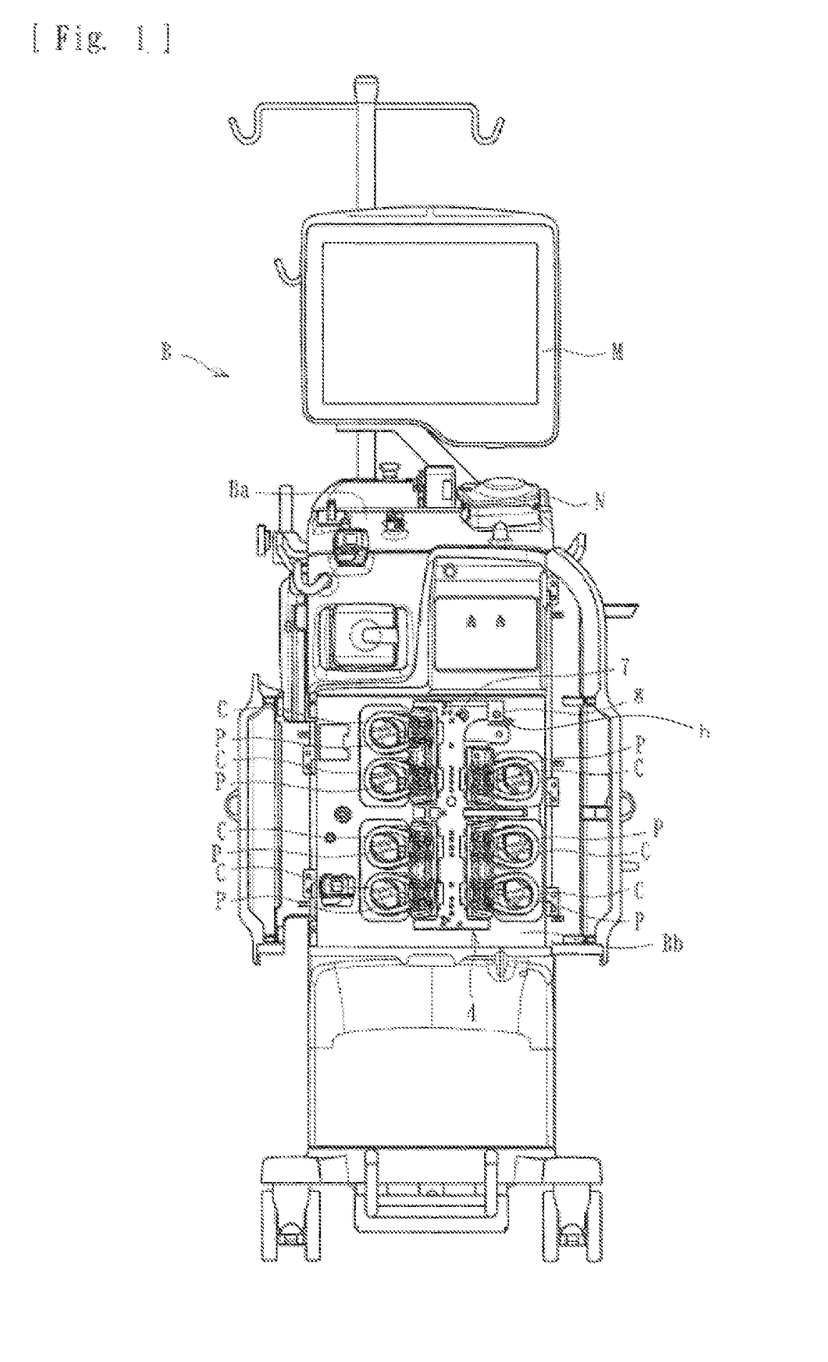
FIG. 1 is an overall diagram of a blood purification apparatus to which an attaching member according to an embodiment of the present teachings are attached.
Figure 2:
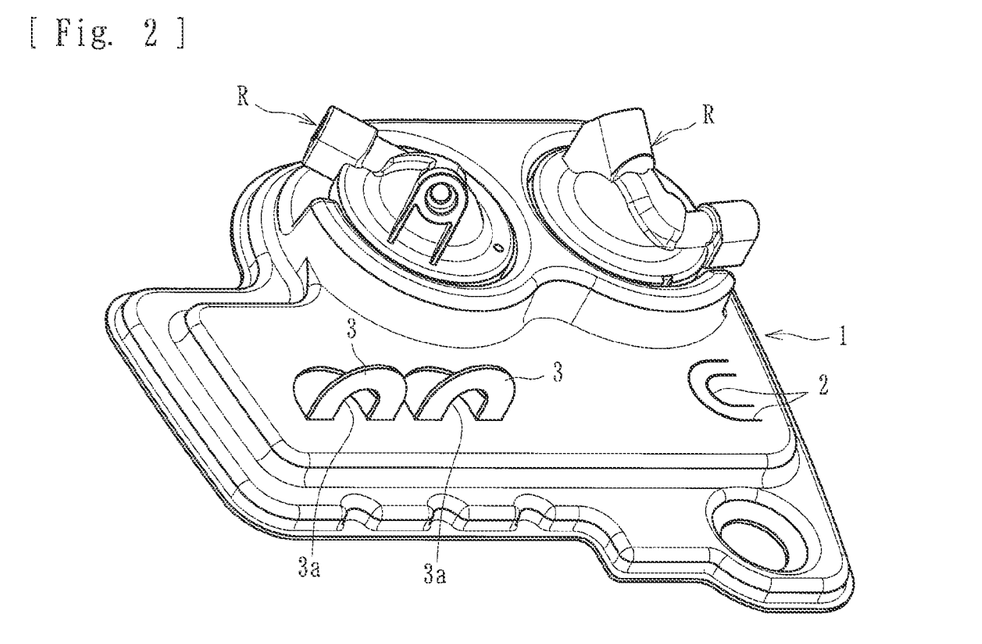
FIG. 2 is a perspective view of the attaching member, with anchor portions thereof raised.
Figure 3:
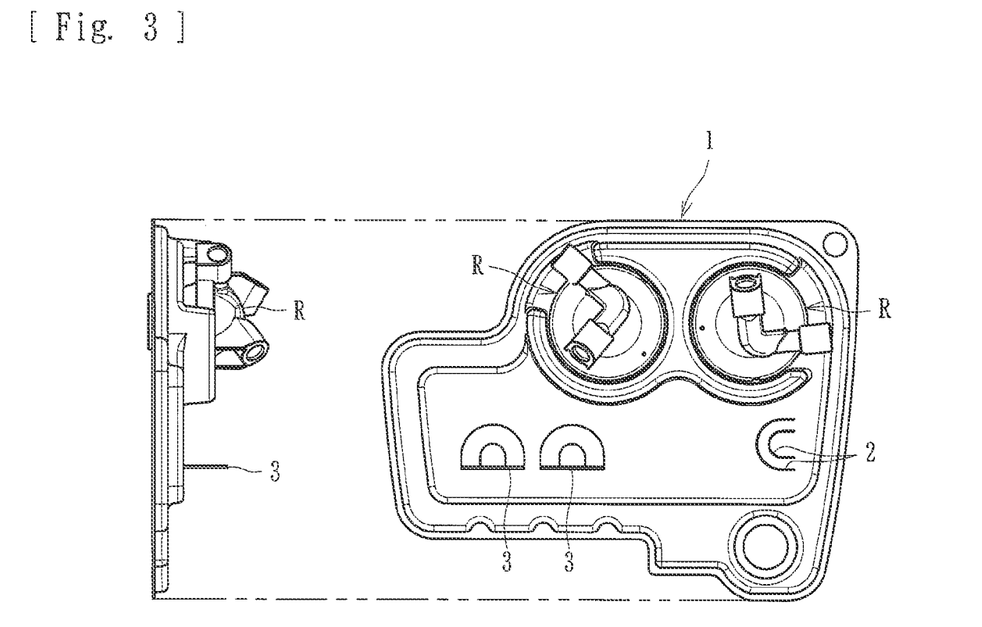
FIG. 3 includes a front view and a side view of the attaching member.

As illustrated in FIG. 1, the blood purification apparatus B applied to the present embodiment is a monitoring apparatus for hemodialysis treatment that includes a monitor M capable of displaying information regarding blood purification treatment and the like, a blood pump N, and so forth. When the blood pump N is activated, blood of a patient is caused to extracorporeally circulate through a blood circuit. Meanwhile, the blood undergoes blood purification treatment in a blood purifier (a dialyzer). The blood purification apparatus B according to the present embodiment includes a plurality of (seven in the present embodiment) peristaltic pumps P provided on the front face thereof, so that substitution fluid and drain liquid can be delivered in the blood purification treatment.

The peristaltic pumps P are each capable of delivering liquid by squeezing a pump tube C in a specific direction and each include a stator having a fitting recess, a rotor provided in the fitting recess and being rotatable about a rotating shaft, and rollers provided on the rotor. When the pump tube C (see FIG. 6) is fitted into the fitting recess of the stator and the rotor is driven to rotate, the pump tube C is squeezed between the wall of the fitting recess and the rollers. Thus, the liquid can be delivered.

The attaching member 1 is made of flexible resin and has, as illustrated in FIGS. 2 to 5, fitting recesses 1a into which pressure detectors R are fittable, and slits 2. The slits 2 may be an inner slit and an outer slit. The sits 2 have a first end and a second end are spaced apart and terminate forming an opening therebetween. The first end and the second end are at opposing ends of the anchor portion. The pressure detectors R each include thereinside a diaphragm with which a liquid chamber to be supplied with liquid and a gas chamber to be supplied with gas are separated from each other. A flexible tube through which a predetermined liquid is to flow is connected to the liquid chamber. The pressure detector R is provided for detecting the pressure (hydraulic pressure) of the liquid that flows through the liquid chamber. In the present embodiment, two pressure detectors R are fittable to the attaching member 1.

Figure 4:
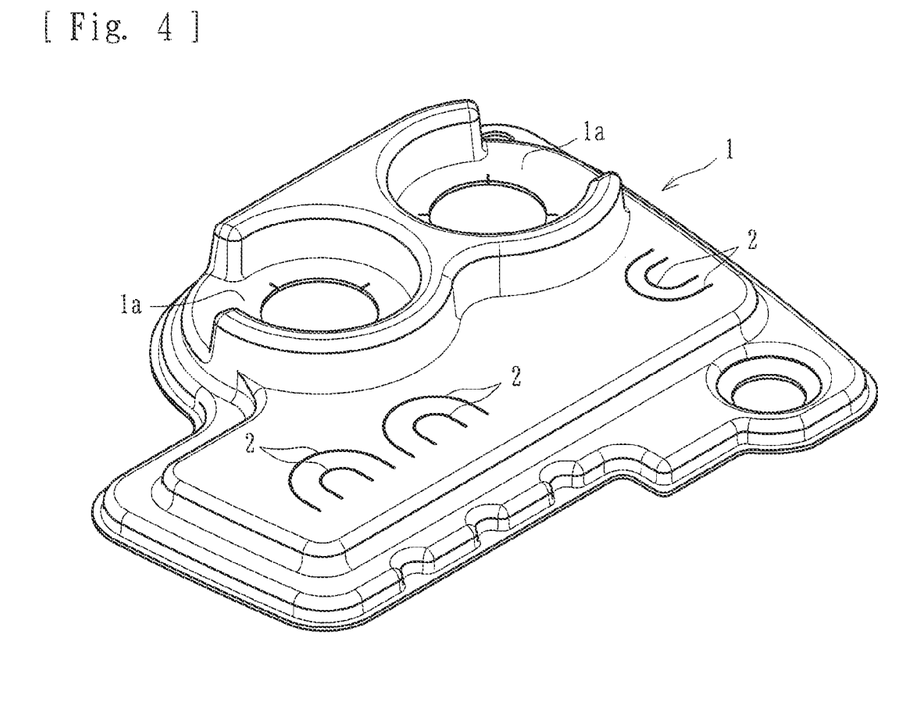
FIG. 4 is a perspective view of the attaching member, with the anchor portions thereof yet to be raised.
Figure 5:
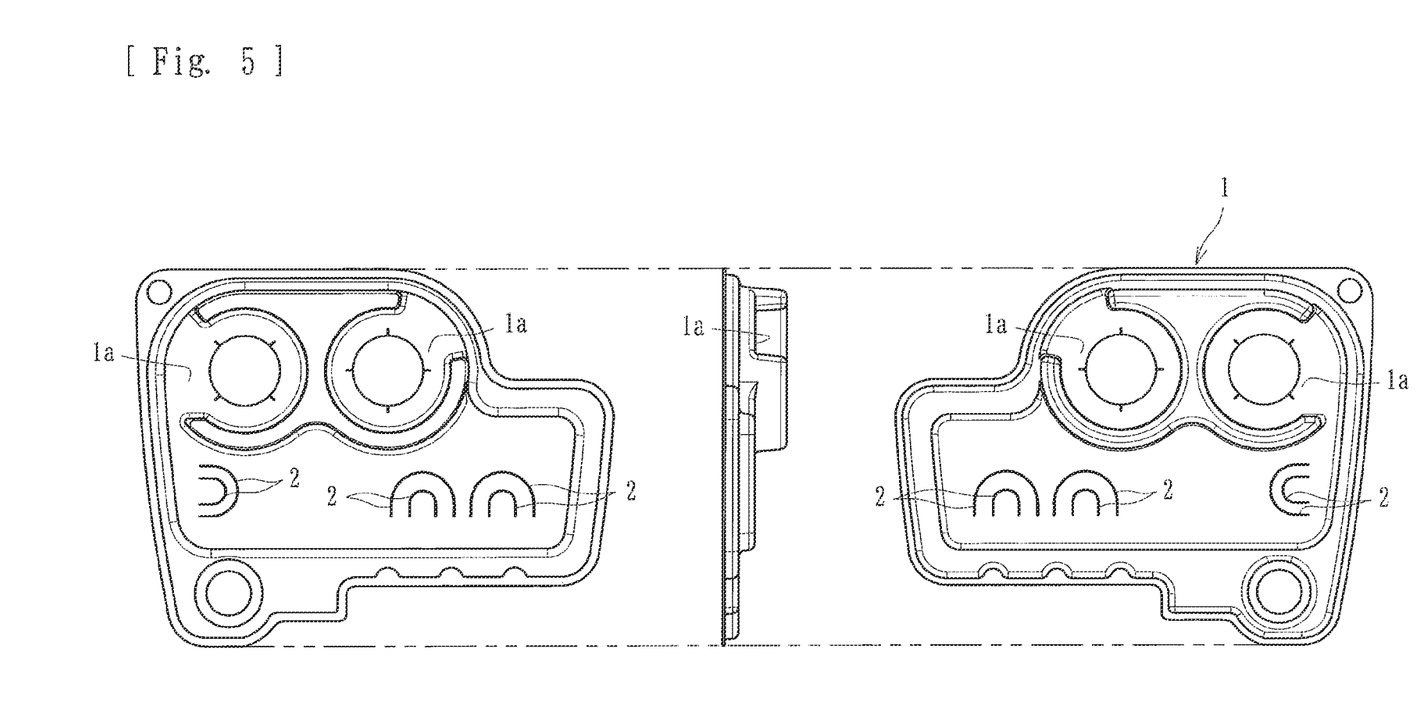
FIG. 5 is a third-angle projection of the attaching member.
Figure 7:
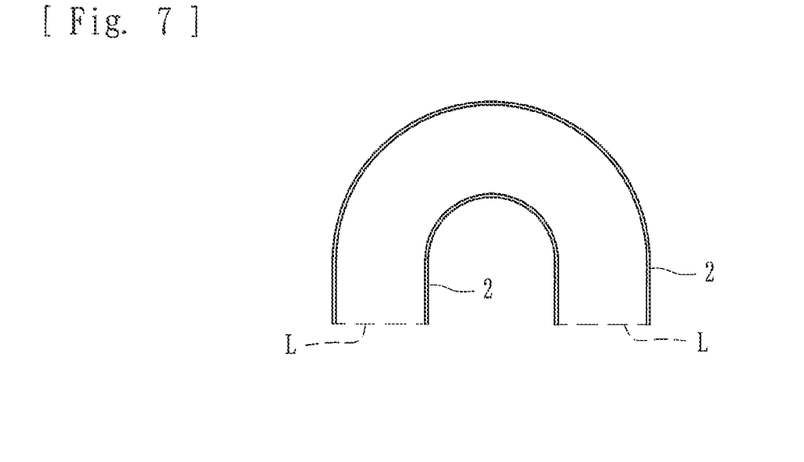
FIG. 7 is a plan view of slits according to the embodiment of the present teachings, illustrating the shapes thereof.

The slits 2 are provided at predetermined positions of the attaching member 1 and for defining portions that are separated from the other portion of the attaching member 1. In the present embodiment, as illustrated in FIGS. 4, 5, and 7, a plurality of semicircular areas each having an arc conforming to the outer peripheral surface of the flexible tube are defined by the slits 2. Any ones of the portions defined by the slits 2 are folded along folds L in such a manner as to be raised substantially perpendicularly to the other portion. The anchor portion extends perpendicular to the attaching member and a has a distance between a first end and a second end of the attaching member. Thus, anchor portions 3 capable of anchoring flexible tubes r are obtained (e.g., the flexible tube is anchored in place).

Figure 8:
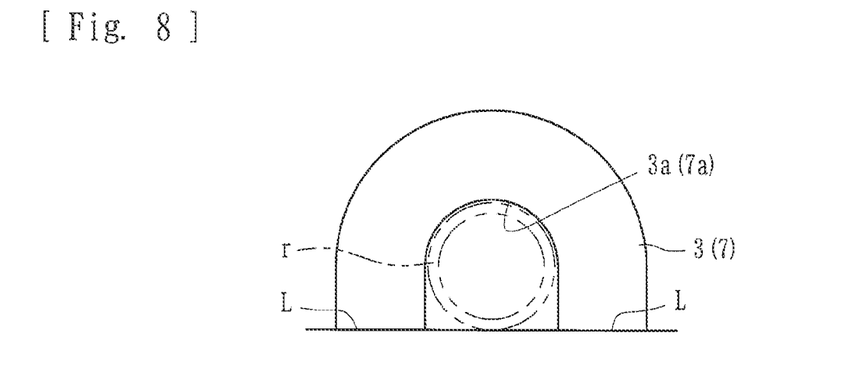
FIG. 8 is a front view of a portion defined by the slits, illustrating a raised state thereof.

Specifically, as illustrated in FIG. 7, a pair of arc-shaped slits 2, an inner one and an outer one, are provided in a planar portion of the attaching member 1. The inner slit (e.g., first slit) and the outer slit (e.g., second slit) may be parallel and mirror shapes of one another) (e.g., may be located a distance apart). The inner slit (e.g., inner slit) may only contact the flexible tube. Lines connecting the ends of the slits 2 form the folds L. As illustrated in FIG. 8, when a portion between the slits 2 is folded at the folds L, the portion is raised from the other portion. Thus, an anchor portion 3 is obtained. A flexible tube r is anchorable in a gap provided on the inner side of the anchor portion 3 (e.g., an edge of the anchor portion). The flexible tube r to be anchored by the anchor portion 3 (e.g., the edge is located adjacent to the flexible tube when the flexible tube extends through the opening) may form either a flow route extending from the pressure detector R or any other flow route. The attaching member is located within the opening as the attaching member remains in place.

The anchor portion 3 is a portion raised from the planar portion of the attaching member 1 and is flexibly bendable in accordance with the thickness and the material thereof. Hence, even if a load is transmitted (e.g., imparted) to the anchor portion 3 from the flexible tube r, the anchor portion 3 can hold the flexible tube r by deforming flexibly in such a manner as to absorb the load. The anchor portion 3 according to the present embodiment has a semicircular shape with an arc 3a conforming to the outer peripheral surface of the flexible tube r. The flexible tube r fits along the arc of the anchor portion 3 and is therefore stably anchorable.

As illustrated in FIGS. 4 and 5, such anchor portions 3 of the attaching member 1 according to the present embodiment are each obtained as follows: a plurality of pairs of slits 2 are provided at arbitrary positions, and any selected portion that is defined by a specific one of the pairs of slits 2 is folded in such a manner as to be raised to form an anchor portion 3 at an arbitrary position where a flexible tube r is to be anchored. Thus, among the portions defined by the slits 2, those at positions where flexible tubes r are desired to be anchored are folded to be raised. Therefore, while the raised portions are used for anchoring the flexible tubes r, the other portions that are not raised remain flat (e.g., coplanar with the attaching member).

The orientation of each of the anchor portions 3 according to the present embodiment that are in the raised state (the direction of folding at the folds L) is set in accordance with the direction in which a corresponding one of the flexible tubes r extends. Therefore, if a load is transmitted from the flexible tube r to the anchor portion 3, the anchor portion 3 can deform naturally to absorb the load flexibly. The positions and sizes of the anchor portions 3 (the slits 2) may be set in various ways, depending on factors, such as size; material; and so forth, of the flexible tubes r to be anchored.

Figure 6:
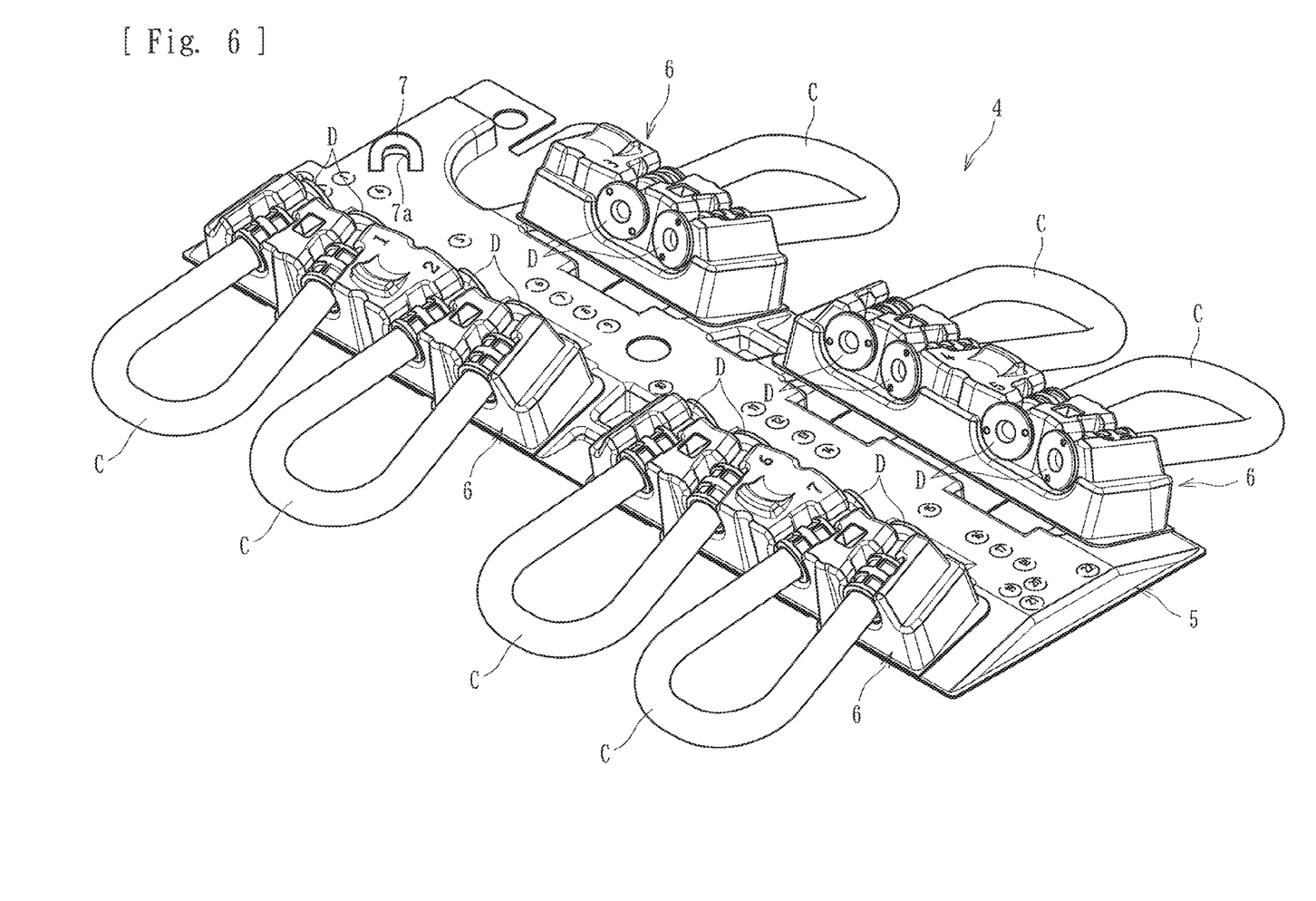
FIG. 6 is a perspective view of another attaching member according to the embodiment of the present teachings.

As with the attaching member 1, the other attaching member 4 according to the present embodiment is made of flexible resin. As illustrated in FIG. 6, the attaching member 4 includes a body 5 attachable to the blood purification apparatus B, and holding portions 6 attached to the body 5 and that hold pump tubes C. The body 5 is to be attached to the predetermined position Bb of the blood purification apparatus B. The holding portions 6 are each a resin molded part projecting in a block-like shape from the body 5 (projecting frontward).

The holding portions 6 receive connectors D provided at two respective ends of each of a plurality of pump tubes C, whereby the connectors D are held at a predetermined height. The pump tubes C are each made of a material such as soft resin or rubber forming a flow route with a relatively large diameter. Each pump tube C has the connectors D at one end and the other end thereof, respectively. After the pump tube C is fitted into and loaded onto the stator of a corresponding one of the peristaltic pumps P (see FIG. 1), the rotor is driven to rotate. Thus, the pump tube C is squeezed in the lengthwise direction by the rollers, so that liquid such as substitution fluid or drain liquid can be delivered.

As with the attaching member 1, the attaching member 4 (another attaching member) according to the present embodiment has slits for obtaining an anchor portion 7. Specifically, the attaching member 4 according to the present embodiment includes an anchor portion 7 (see FIG. 8) defined by slits in such a manner as to be separated from the other portion and to be foldable, the anchor portion 7 being capable of anchoring a flexible tube r when folded to be raised from the other portion so that the flexible tube extends above the other portion and then through the opening.

The anchor portion 7 is a portion raised from a planar portion of the attaching member 4 and is flexibly bendable in accordance with the thickness and the material thereof. Hence, even if a load is transmitted to the anchor portion 7 from the flexible tube r, the anchor portion 7 can hold the flexible tube r by deforming flexibly in such a manner as to absorb the load. The anchor portion 7 according to the present embodiment has a semicircular shape with an arc 7a conforming to the outer peripheral surface of the flexible tube r. The flexible tube r fits along the arc of the anchor portion 7 and is therefore stably anchorable.

Figure 12:
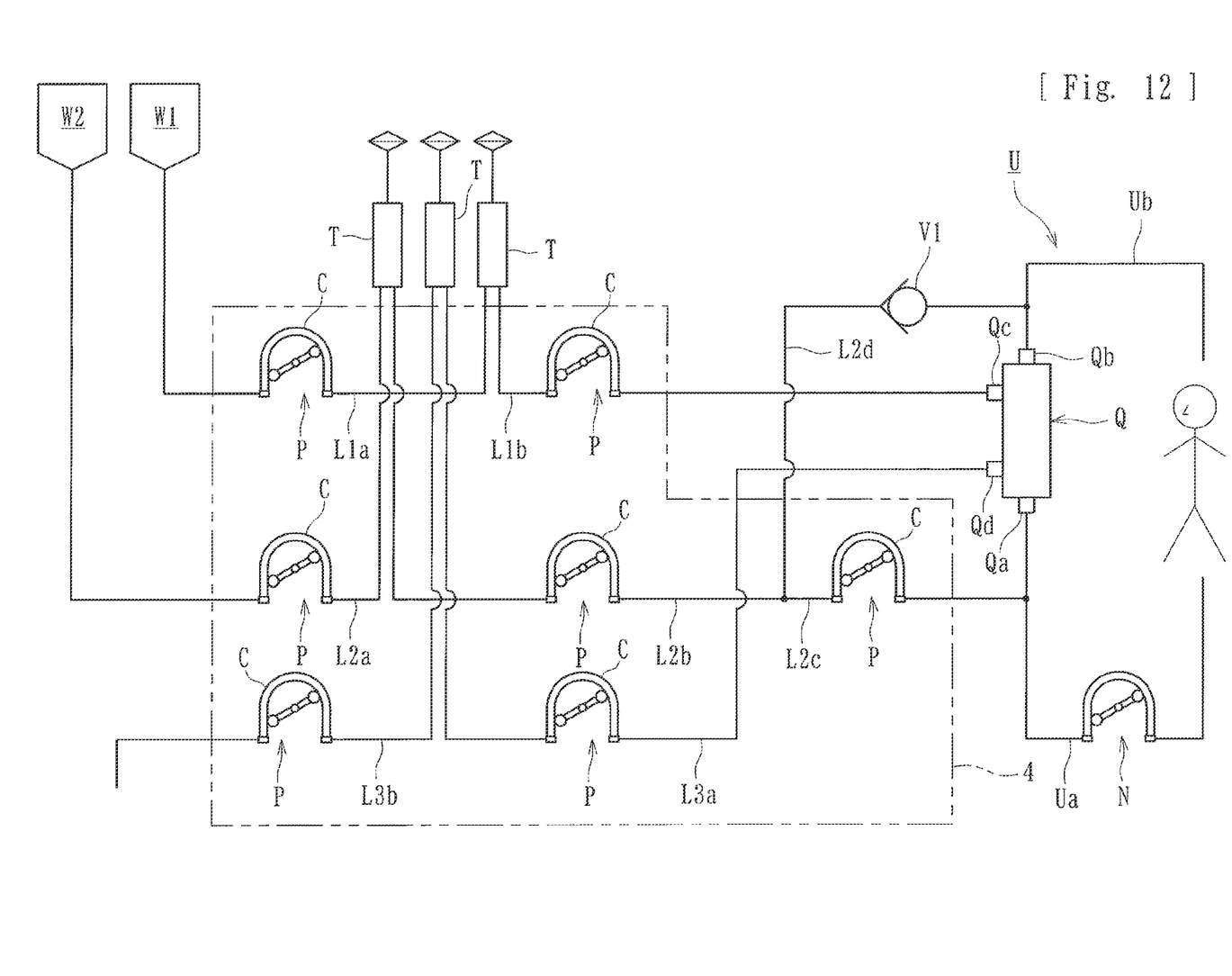
FIG. 12 is a diagram illustrating a blood purification apparatus with the attaching member attached thereto, and is provided for describing blood purification treatment.

When the attaching member 4 is anchored to the predetermined position Bb of the blood purification apparatus B and the pump tubes C are loaded onto the respective peristaltic pumps P, a treatment apparatus for blood purification treatment is established as illustrated in FIG. 12. The treatment apparatus includes a blood circuit U including a dialyzer Q; a first dialysate introduction line L1a and a second dialysate introduction line L1b through which dialysate is introduced into the dialyzer Q; a first substitution line L2a, a second substitution line L2b, a pre-substitution line L2c, and a post-substitution line L2d through which substitution fluid is supplied to the blood circuit U; and a first drain-liquid discharge line L3a and a second drain-liquid discharge line L3b through which drain liquid is drained from the dialyzer Q.

The blood circuit U includes an arterial blood circuit Ua and a venous blood circuit Ub. When the blood pump N is activated while a patient is punctured with the distal ends of the arterial blood circuit Ua and the venous blood circuit Ub, blood of the patient can be caused to extracorporeally circulate. The dialyzer Q has a blood introduction port Qa, a blood delivery port Qb, a dialysate introduction port Qc, and a dialysate delivery port Qd all projecting from a housing thereof. The arterial blood circuit Ua is connected to the blood introduction port Qa. The venous blood circuit Ub is connected to the blood delivery port Qb. The second dialysate introduction line L1b is connected to the dialysate introduction port Qc. The first waste-liquid discharge line L3a is connected to the dialysate delivery port Qd.

The first dialysate introduction line L1a is connected to a dialysate bag W1 that stores dialysate and is also connected to the second dialysate introduction line L1b through a temporary chamber T. When the peristaltic pumps P provided to the first dialysate introduction line L1a and the second dialysate introduction line L1b are activated, the dialysate in the dialysate bag W1 is temporarily stored in the temporary chamber T and is then introduced into the dialyzer Q.

The first substitution L2a is connected to a substitution-fluid bag W2 that stores substitution fluid and is also connected to the second substitution line L2b through a temporary chamber T. The second substitution line L2b is connected to the blood circuit U through the pre-substitution line L2c connected to the arterial blood circuit Ua and through the post-substitution line L2d connected to the venous blood circuit Ub. The post-substitution line L2d is provided with a check valve V1. When the peristaltic pumps P provided to the first substitution line L2a and the second substitution line L2b are activated, the substitution fluid in the substitution-fluid bag W2 is temporarily stored in the temporary chamber T and is then introduced into the arterial blood circuit Ua or the venous blood circuit Ub in accordance with the state of operation of the peristaltic pump P provided to the pre-substitution line L2c.

The first drain-liquid discharge line L3a is connected to the dialyzer Q and is also connected to the second drain-liquid discharge line L3b through a temporary chamber T. The second drain-liquid discharge line L3b allows the drain liquid to be drained therethrough to the outside of the apparatus. When the peristaltic pumps P provided to the first drain-liquid discharge line L3a and the second drain-liquid discharge line L3b are activated, the drain liquid in the dialyzer Q is temporarily stored in the temporary chamber T and is then allowed to be drained to the outside of the apparatus.

As described above, the pump tubes C of the attaching member 4 are connected to the flow routes (the first substitution line L2a, the second substitution line L2b, and the pre-substitution line L2c) through which the substitution fluid is introduced into the blood circuit U, the flow routes (the first dialysate introduction line L1a and the second dialysate introduction line L1b) through which the dialysate is introduced into the dialyzer Q (a blood purifier) connected to the blood circuit U, and the flow routes (the first drain-liquid discharge line L3a and the second drain-liquid discharge line L3b) through which the drain liquid is drained from the dialyzer Q (the blood purifier). The post-substitution line L2d may also be connected to one of the pump tubes C of the attaching member 4.

In the present embodiment, none of the pump tubes C of the attaching member 4 is attached to the blood pump N. Alternatively, one of the pump tubes C of the attaching member 4 may be attached to the blood pump N by loading the pump tube C thereon. In such a case, what is to be connected to the pump tube C of the attaching member 4 is the blood circuit U. That is, devices that are loadable onto the pump tubes C of the attaching member 4 according to the present teachings include a blood purification circuit that includes the following: the blood circuit U through which the blood is caused to extracorporeally circulate, the flow routes (the first substitution line L2a, the second substitution line L2b, and the pre-substitution line L2c (or the post-substitution line L2d)) through which the substitution fluid is introduced into the blood circuit U, the flow routes (the first dialysate introduction line L1a and the second dialysate introduction line L1b) through which the dialysate is introduced into the dialyzer Q (the blood purifier) connected to the blood circuit U, or the flow routes (the first drain-liquid discharge line L3a and the second drain-liquid discharge line L3b) through which the drain liquid is drained from the dialyzer Q (the blood purifier).

According to the above embodiment, the attaching member (1 or 4) includes the anchor portion (3 or 7) defined by the slits 2 in such a manner as to be separated (e.g., movable) from the other portion and to be foldable, the anchor portion (3 or 7) being capable of anchoring the flexible tube r when folded to be raised from the other portion. Therefore, while the flexible tube r is held assuredly, the increase in the size can be avoided, and the occurrence of kinks or bends in the flexible tube r can be suppressed.

The anchor portion (3 or 7) according to the present embodiment has an opening into which the flexible tube r is inserted to be anchored (e.g., supported (e.g., the opening is located between a first fold and a second fold so that the flexible tube extends therethrough)). The first fold and the second fold connect the anchor portion to the attaching member. The first fold is located at a first end and the second fold is located at a second end of the anchor member The first fold and the second fold are co-linear. Therefore, the flexible tube r can be held assuredly. Furthermore, the anchor portion (3 or 7) has a semicircular shape with the arc (e.g., has a radius) (3a or 7a) conforming to the outer peripheral surface of the flexible tube r (e.g., a radius of the outer tube is substantially identical to the radius of the anchor portion). Therefore, the flexible tube r can be held stably and much more assuredly. The anchor portion (3 or 7) is not limited to the one having the arc (3a or 7a) (e.g., with a radius) and may have, for example, a rectangular opening into which the flexible tube r is inserted to be anchored.

The orientation of the anchor portion 3 (and the anchor portion 7 as well) according to the present embodiment that is in the raised state is set in accordance with the direction in which the flexible tube r extends. Therefore, the application of an unnatural force to the flexible tube r anchored (e.g., retained) by the anchor portion 3 can be suppressed. In particular, the slits 2 are some of a plurality of sets of slits 2 that are provided at arbitrary positions, and any selected portion that is defined by a specific one of the sets of slits 2 is folded in such a manner as to be raised (e.g., the anchor portions are raisable from the other portion) to form the anchor portion 3 at an arbitrary position where the flexible tube r is to be anchored. Therefore, portions where no flexible tubes r are anchored do not need to be raised, preventing the interference with any other portion or flexible tube r.

Figure 9:
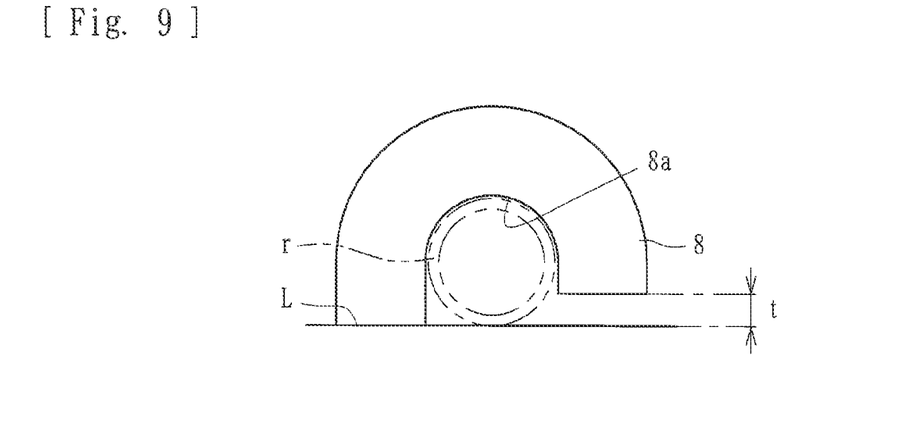
FIG. 9 is a diagram illustrating an anchor portion (a hook-shaped anchor portion) according to a modification of the embodiment of the present teachings.

While some embodiments have been described above, the present teachings is not limited thereto. For example, as illustrated in FIG. 9, the attaching member may include an anchor portion 8 having a fold L and a gap t, the anchor portion 8 being obtained by folding, at the fold L, a portion defined by a slit in such a manner as to be separated from the other portion, the anchor portion 8 having a hook shape with an arc 8a conforming to the outer peripheral surface of the flexible tube r. In such a case, since the anchor portion 8 has a hook shape with the arc 8a conforming to the outer peripheral surface of the flexible tube, the flexible tube r can be held stably. Furthermore, since the flexible tube r can be inserted through the gap t, the anchoring of the flexible tube r at the anchor portion 8 can be achieved easily.

Figure 10:
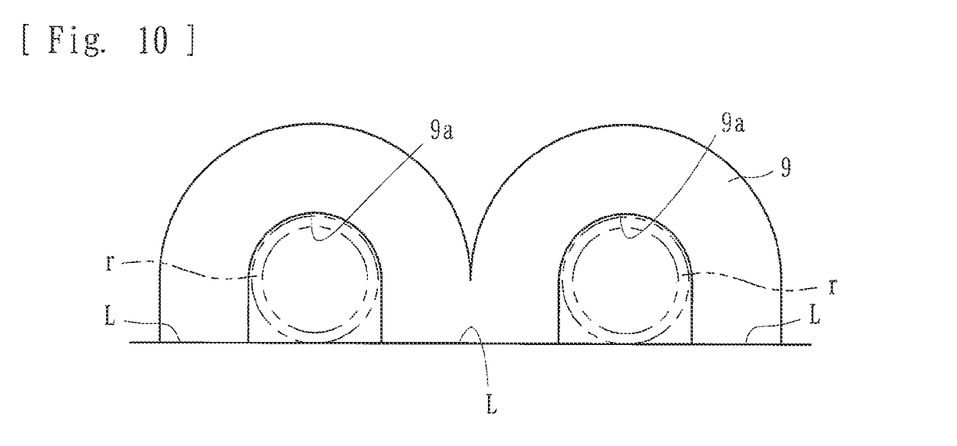
FIG. 10 is a diagram illustrating an anchor portion (an anchor portion including a plurality of semicircular segments) according to another modification of the embodiment of the present teachings.
Figure 11:
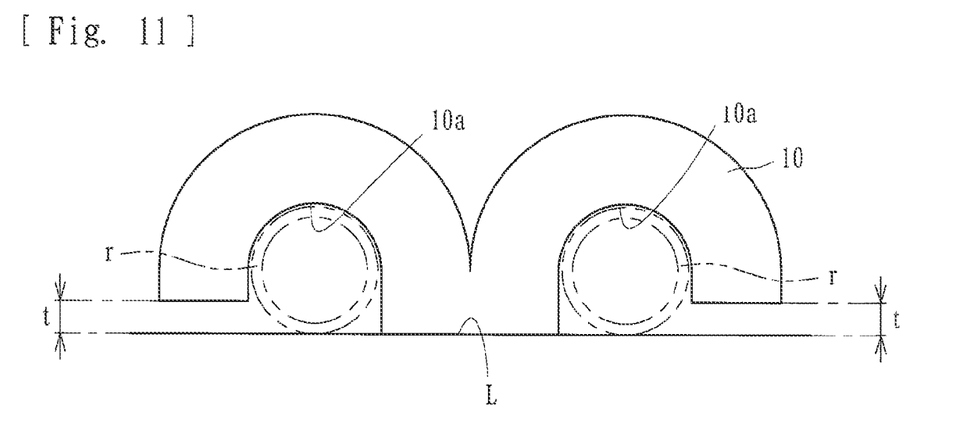
FIG. 11 is a diagram illustrating an anchor portion (an anchor portion including a plurality of hook-shaped segments) according to yet another modification of the embodiment of the present teachings.

Alternatively, as illustrated in FIG. 10, the attaching member may include an anchor portion 9 having a plurality of (two in the present embodiment) arcs 9a each conforming to the outer peripheral surface of the flexible tube r. In such a case, a plurality of flexible tubes r can be held collectively with one anchor portion 9. That is, a plurality of flexible tubes r can be held efficiently. As another alternative, as illustrated in FIG. 11, the attaching member may include an anchor portion 10 having a plurality of (two in the present embodiment) arcs 10a each conforming to the outer peripheral surface of the flexible tube r. In such a case, a plurality of flexible tubes r can be held collectively with one anchor portion 10. Furthermore, since the flexible tubes r can be inserted through respective gaps t, the anchoring of the flexible tubes r at the anchor portion 10 can be achieved easily. The positions of the positioning pin g and the positioning hole h may be defined arbitrarily. Moreover, the present teachings may be applied to a blood purification apparatus B including no positioning pin g, with an attaching member 1 having no positioning hole h.

The attaching member may have other additional functions or the like, as long as the attaching member includes an anchor portion defined by a slit in such a manner as to be separated from the other portion and to be foldable, the anchor portion being capable of anchoring a flexible tube when folded to be raised from the other portion.

REFERENCE SIGN LIST 1 attaching member
1a fitting recess
2 slit
3 anchor portion
4 attaching member (another attaching member)
5 body
6 holding portion
7 anchor portion
8 to 10 anchor portion (anchor portion according to a modification)
B monitoring apparatus (blood purification apparatus)
Ba predetermined position
Bb predetermined position
C pump tube
M monitor
P peristaltic pump

The invention claimed is:

1. An attaching member comprising:
an anchor portion defined by an inner slit that forms a first shape and an outer slit that forms a second shape in such a manner as to be separated from an other portion of the attaching member and to be foldable about a first fold at a first end of the inner slit and the outer slit and a second fold at a second end of the inner slit and the outer slit, the anchor portion being capable of anchoring a flexible tube in place when the anchor portion is raised from the other portion,
wherein the anchor portion includes an opening that is located between the first fold and the second fold and between the other portion of the attaching member and the inner slit so that, when the anchor portion is raised from the other portion, a part of the other portion forming the opening remains coplanar with the attaching member such that the flexible tube extends above the other portion and through the opening along the part of the other portion, between the first fold and the second fold and between the other portion, and the inner slit, wherein the anchor portion is directly connected to the other portion at the first fold and the second fold and is foldable about the first fold and the second fold,
wherein the attaching member is configured to attach to a blood purification apparatus and the attaching member is configured to hold the flexible tube, and the attaching member is formed with a fitting recess at which a pressure detector attached to the blood purification apparatus is fittable or with a holding portion that holds a pump tube; and
wherein the opening in the anchor portion has an arc with a semicircular shape that conforms to an outer peripheral surface of the flexible tube and terminates at the first end and the second end of the inner slit and the outer slit.

2. The attaching member according to claim 1, wherein the anchor portion has a plurality of arcs each conforming to the outer peripheral surface of the flexible tube.

3. A blood purification circuit to be anchored to the attaching member according to claim 1, the blood purification circuit comprising a blood circuit through which blood is caused to extracorporeally circulate, and a flow route through which substitution fluid is introduced into the blood circuit or a flow route through which dialysate is introduced into a blood purifier which is connected to the blood circuit or through which drain liquid is drained from the blood purifier.

4. The attaching member of claim 1, wherein the anchor portion anchors the flexible tube so that the flexible tube is retained while liquid flows through the flexible tube.

5. The attaching member of claim 1, wherein the first end and the second end are at opposing ends of the anchor portion and directly connect the anchor portion to the attaching member.

6. The attaching member of claim 1, wherein the flexible tube that forms a flow route extending from the pressure detector attached to the attaching member is inserted into the opening of the anchor portion to be anchored.

7. The attaching member of claim 1, wherein the flexible tube is inserted into the opening of the anchor portion to be anchored when the pump tube held in the holding portion is attached to a pump of the blood purification apparatus.

8. The attaching member of claim 1, wherein the anchor portion is configured to deform to absorb a load imparted on the anchor portion by the flexible tube.

9. An attaching member comprising:
anchor portions defined by an inner slit that forms a first shape and an outer slit that forms a second shape, and the anchor portions are separable from an other portion of the attaching member while a part of the other portion remains in place to form an opening within the inner slit, and the anchor portion are foldable about a first fold at a first end of the inner slit and the outer slit and a second fold at a second end of the inner slit and the outer slit, wherein the opening receives a flexible tube and the opening is capable of anchoring the flexible tube between the anchor portions and the part of the other portion when each of the anchor portions are raised from the other portion about the first fold and the second fold;
wherein an orientation of each of the anchor portions when raised into a raised state are substantially perpendicular to the other portion and directly connected to the other portion;
wherein the opening is set in accordance with a direction in which the flexible tube extends so that an edge of each of the anchor portions are located adjacent to the flexible tube when the flexible tube extends through the opening and between the inner slit and the part of the other portion so that each of the anchor portions hold the flexible tube in place between the inner slit and the part of the other portion extending around the flexible tube;
wherein the anchor portions that are not used for anchoring the flexible tube remain flat;
wherein the attaching member is configured to attach to a blood purification apparatus and the attaching member is configured to hold the flexible tube, and the attaching member is formed with a fitting recess at which a pressure detector is attached to the blood purification apparatus is fittable or within a holding portion that holds a pump tube;
wherein the inner slit and the outer slit are two of a plurality of slits that are each provided at an arbitrary position in the attaching member, and any selected portion that is defined by a specific one of the inner slit and the outer slit is folded in an arbitrary and selective manner as to be raised in accordance with the direction in which the flexible tube extends and to form the anchor portion at each of the arbitrary positions where the flexible tube is to be anchored; and wherein the opening in the anchor portion has an arc with a semicircular shape that conforms to an outer peripheral surface of the flexible tube and terminates at the first end and the second end of the inner slit and the outer slit.

10. The attaching member according to claim 9, wherein the semicircular shape conforms to the outer peripheral surface of the flexible tube.

11. The attaching member according to claim 9, wherein each of the anchor portions have a plurality of arcs each conforming to the outer peripheral surface of the flexible tube.

12. A blood purification circuit to be anchored to the attaching member according to claim 9, the blood purification circuit comprising a blood circuit through which blood is caused to extracorporeally circulate, and a flow route through which substitution fluid is introduced into the blood circuit or a flow route through which dialysate is introduced into a blood purifier which is connected to the blood circuit or through which drain liquid is drained from the blood purifier.

13. The attaching member of claim 9, wherein each of the anchor portions are raisable from the other portion so that the flexible tube is retained while liquid flows through the flexible tube.

14. The attaching member of claim 9, wherein the first end and the second end of the anchor portions are connected to the other portion and each of the anchor portions are raised from the other portion about the first end and the second end.

15. The attaching member of claim 9, wherein the first fold and the second fold are co-linear.

16. The attaching member of claim 9, wherein a radius of the opening is substantially identical to a radius of the flexible tube.

17. An attaching member comprising:
a first slit formed in the attaching member, the first slit having a first shape that extends from a first end to a second end;
a part of the attaching member formed within the first slit;
a second slit formed in the attaching member, the second slit having a second shape that extends parallel to and mirrors the first shape so that the second slit extends from the first end to the second end, wherein the first end and the second end are spaced apart and an anchor portion is formed between the first slit and the second slit and the anchor portion extends from the first end to the second end;
a first fold located at the first end of the first slit and the second slit of the anchor portion that connects the first end of the anchor portion to the attaching member so that the first end of the anchor portion is movable about the first fold relative to the attaching member to raise the first end from the attaching member;
a second fold located at the second end of the first slit and the second slit of the anchor portion that connects the second end of the anchor portion to the attaching member so that the anchor portion is movable about the second fold relative to the attaching member to raise the second end from the attaching member; and
wherein an opening in the anchor portion is located between the first fold and the second fold and the first slit and the part of the attaching member, and the opening is configured to receive a flexible tube that extends through the opening and support the flexible tube between the part of the anchor portion and the attaching member;
wherein the attaching member is configured to attach to a blood purification apparatus and the attaching member is configured to hold the flexible tube, and the attaching member is formed with a fitting recess at which a pressure detector attached to the blood purification apparatus is fittable or with a holding portion that holds a pump tube; and
wherein the opening in the anchor portion has an arc with a semicircular shape that conforms to an outer peripheral surface of the flexible tube and terminates at the first end and the second end.

18. The attaching member of claim 17, wherein the anchor portion is substantially perpendicular to the attaching member when the anchor portion is raised.

19. The attaching member of claim 17, wherein the first slit and the second slit are located a distance apart and the distance extends perpendicular to the attaching member and the flexible tube contacts only the first slit as the flexible tube extends through the opening.

20. The attaching member of claim 19, wherein the flexible tube is in contact with the first slit and the attaching member located within the opening as the flexible tube extends through the opening.

* * * * *